United States Patent

Hill

[15] 3,698,458

[45] Oct. 17, 1972

[54] EMBRYO STRIPPER

[72] Inventor: Wayne E. Hill, Rosemont, Md.

[73] Assignee: The United States of America as represented by the Secretary of the Army

[22] Filed: Feb. 11, 1971

[21] Appl. No.: 114,439

[52] U.S. Cl. .................................. 146/2 R, 195/127
[51] Int. Cl. ............................. C12k 7/00, C12k 9/00
[58] Field of Search ............... 146/2 R, 2 B, 2 C, 2 D; 128/221, 31, 361, 307; 195/104, 127

[56] References Cited

UNITED STATES PATENTS

| | | |
|---|---|---|
| 3,420,743 | 1/1969 | Sandhage et al. ....... 146/2 R X |
| 1,878,294 | 9/1932 | Regensburger ............ 146/2 D |
| 3,486,982 | 12/1969 | Noren ....................... 195/127 |
| 3,616,262 | 10/1971 | Coady ..................... 146/2 R X |

*Primary Examiner*—Willie G. Abercrombie
*Attorney*—Harry M. Saragovitz, Edward J. Kelly and Herbert Berl

[57] ABSTRACT

An embryo stripper utilized in combination with a conventional egg breaker comprising a sloped tray mounted under the egg breaker to receive the embryo containing sacs, a trough having a slope traverse to the slope of the tray in juxtaposition to the tray in order to receive the embryo containing sacs, funnel means extending downward from one end of the trough to conduct the embryo containing sacs to a cutter assembly. The cutter assembly slashes the sacs to liberate the embryos. The embryos are retained on collecting means suitably designed to allow the sacs and allantoic fluids to drop into a waste chute below.

2 Claims, 6 Drawing Figures

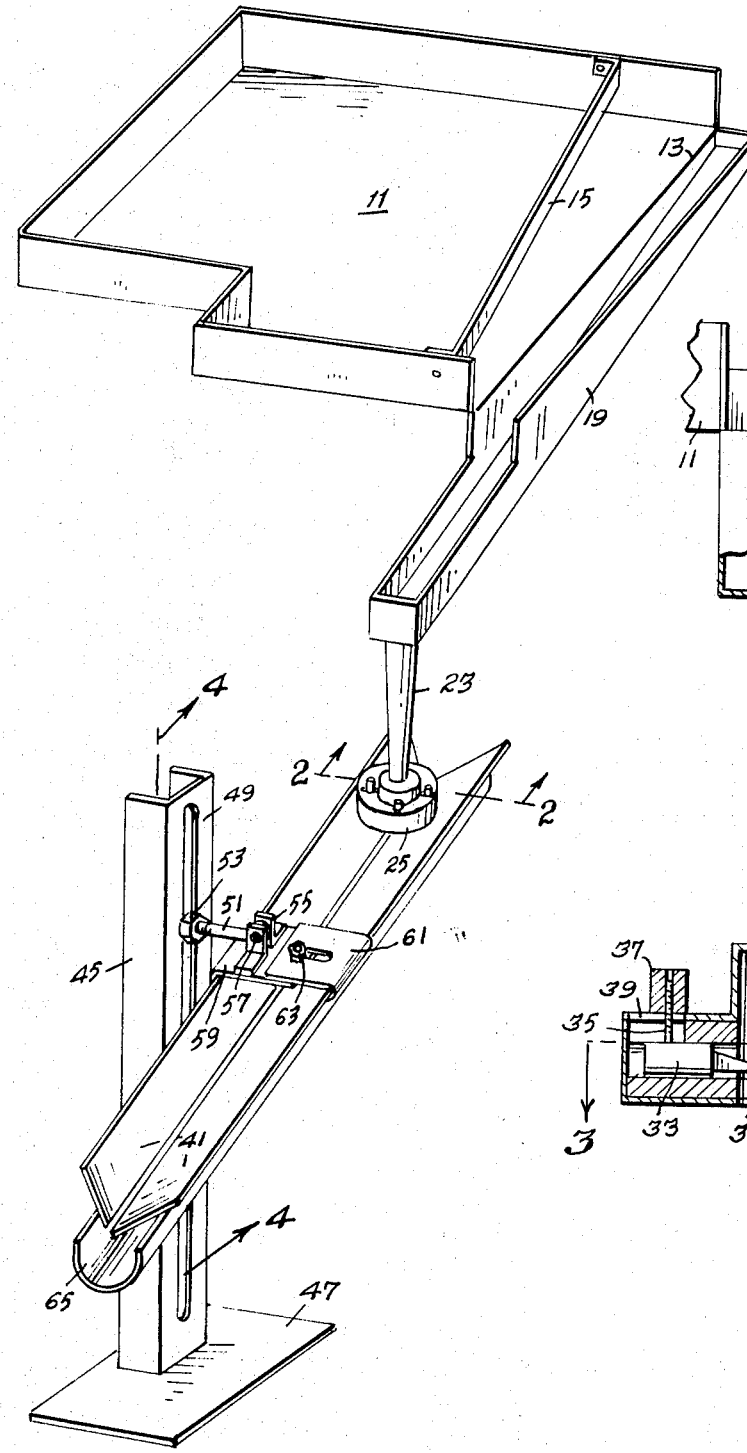

INVENTOR,
Wayne E. Hill

EMBRYO STRIPPER

The invention described herein may be manufactured, used, and licensed by or for the Government for governmental purposes without the payment to me of any royalty thereon.

The present invention relates to an apparatus and system for harvesting infected embryos from eggs.

Fertile eggs are utilized in the cultivation of microorganisms, e.g., rickettsiae. The eggs are incubated until embryos are well developed, e.g., for a period of 5 to 14 days. The eggs are then inoculated, e.g., by injecting a micro-organism into the yoke sac. The developed embryos are subsequently harvested to recover the propagated micro-organisms.

The prior art method for harvesting infected embryos requires a trained technician, working through a biological safety cabinet, to manually break the egg shell, remove the sac containing the embryo and then by proper manipulation of a hand and fingers "pop" the embryo out of the sac.

The present invention relates to an apparatus for mechanically harvesting infected embryos. The present apparatus eliminates the manual handling of infected embryonated chicken eggs as well as substantially increasing the harvesting rate.

It is an object of this invention to provide and disclose an automated system for harvesting infected chicken embryos.

Other objects and a fuller understanding of the invention may be had by referring to the following description and claims taken in conjunction with the accompanying drawing in which:

FIG. 1 shows a prospective view of the present apparatus.

FIG. 2 shows a section through line 2—2 of FIG. 1.

Figure 3:
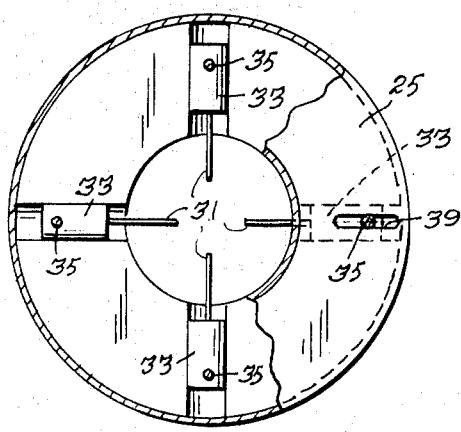
FIG. 3 shows a section through line 3—3 of FIG. 2.
Figure 4:
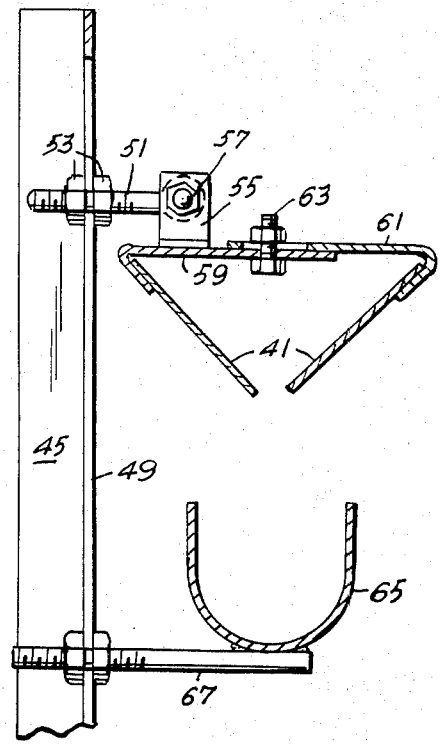
FIG. 4 shows a vertical section taken along line 4—4 of FIG. 1.

Referring now to FIG. 1 of the drawing, the present system comprises receiving tray 11 having open end 13. The tray may be supported by any suitable means not shown. The tray is positioned sloping downwardly at an angle of approximately 12° to 15° from horizontal. Shell guard 15, comprising a metal strip, is positioned at a slight bias across the tray at a position near open end 13. The shell guard is raised a short distance from the bottom surface of tray 11. Trough 19, which is juxtaposition to open end 13, is closed on both ends and comprises a slope 12° to 15° from horizontal, traverse to the slope of receiving tray 11. The trough extends pass the end of receiving tray 11 and comprises passageway 21 connecting with funnel means 23 and a cutter assembly inclosed in cylindrical housing 25. Housing 25 comprises ingress means 27 and egress means 29. Four identical diametrically opposed scalpel blades, designated 31, attached to four identical scalpel blade holders, designated 33 are positioned in housing 25. Four identical bolts, designated 35 and comprising an externally threaded end suitably contoured to be compatible with nuts 37, are affixed to scalpel blade holders 33. Slots 39, extending through the surface of housing 25, permits the forward or backward movement of bolts 35 when nuts 37 are loosened, and thus adjustment of the scalpel blades. Separator trough 41 consisting of two plates secured so as to form a "V" configuration, is positioned immediately below egress means 29 of the housing 25. The separator trough is supported by a stand comprising channel bar segment 45 and traverse base segment 47 thereof. The face of channel bar 45 comprises slotted segment 49 along the face thereof. Slotted segment 49 is suitably contoured to receive the threaded end of eye bolt 51. The eye bolt is secured to channel bar 45 by means of two nuts, designated 53, positioned on each side of slot 49. This permits separator trough 41 to be adjusted vertically as well as to any desired slope from horizontal. Eye bolt 51 is connected to clamping means 55 by traverse bolt and nut assembly 57. Clamping means 55 engages adjustable securing means 59 and 61 which comprise a flat metal panel having down and inwardly extending ends in order to secure the segments of separator trough 41. Securing means 59 and 61 may be attached to the separator trough panels in any conventional manner, e.g., welds. Securing means 59 and 61 are connected by means of bolt and nut assembly 63. Securing means 61 comprises a slot extending through the surface thereof, not shown, whereby the apex of separator trough 41 may be adjusted. Waste chute 65 is positioned below trough 41. The waste chute is secured to the face of channel bar 45 in a manner identical to separator trough 41, i.e., by means of bolt and nut assembly 67. Waste chute 65 may be secured to assembly 67 by means of a weld, not shown. The above arrangement permits waste chute 65 to be adjusted vertically as well as to any desired slope from horizontal.

Figure 5:
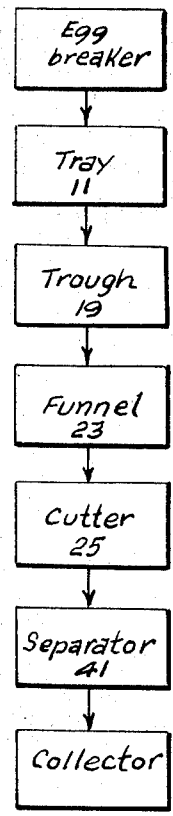
FIG. 5 is a flow chart designed to show the operation of the system.

Referring now to FIG. 5 of the drawing, the present apparatus is utilized in combination with a Seymour Egg Breaker/Separator, Model 101. In operation, the embryo containing egg sacs are deposited on the surface of tray 11 and conducted by gravity into trough 19, as indicated by directional arrow. The shell guard component of tray 11 prevents any large particles of egg shells, that might be dropped onto the tray, from moving along with the sacs and causing blockage at latter points. The embryo containing egg sacs then pass through the passageway of funnel 23 and into cutter assembly 25 where the scalpel blades slash the egg sacs, thereby liberating the embryos. The embryos are retained on "V" shaped separator trough 41, while the sacs and allantoic fluids pass through the apex of the separator trough and drop into a waste chute positioned immediately below. Separator 41 is connected to a suitable collector.

Figure 6:
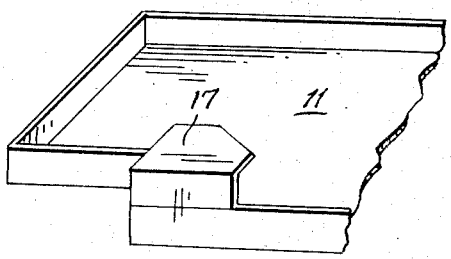
FIG. 6 shows a modification of the egg tray.

FIG. 6, which illustrates a modification of tray 11, contains corner guard 69 which prevents any slow dropping sacs from being carried into the egg shell waste chute of the egg breaking machine or inadvertently being dropped onto the floor.

Although I have described my invention with a certain degree of particularity, it is understood that the present disclosure has been made only by way of example and that numerous changes in the details of construction and arrangement of parts may be resorted to without departing from the spirit and the scope of the invention as hereinafter claimed.

Having described my invention, I claim:

1. An apparatus for the automated harvesting of infected embryos from eggs comprising means for receiving the embryo containing sacs, means for introducing the sacs into a cutter assembly comprising a set of four diametrically opposed scalpel blades in order to slash the sacs thereby liberating the embryos, means for separating the embryos from the waste materials and means for collecting the embryos.

2. A system for harvesting infected embryos from eggs comprising an egg breaking machine in combination with means for receiving the embryo containing sacs, means for introducing the sacs into a cutter assembly comprising a set of four diametrically opposed scalpel blades in order to slash the sacs thereby liberating the embryos, means for separating the embryos from the waste materials, and means for collecting the embryos.

* * * * *